UNITED STATES PATENT OFFICE.

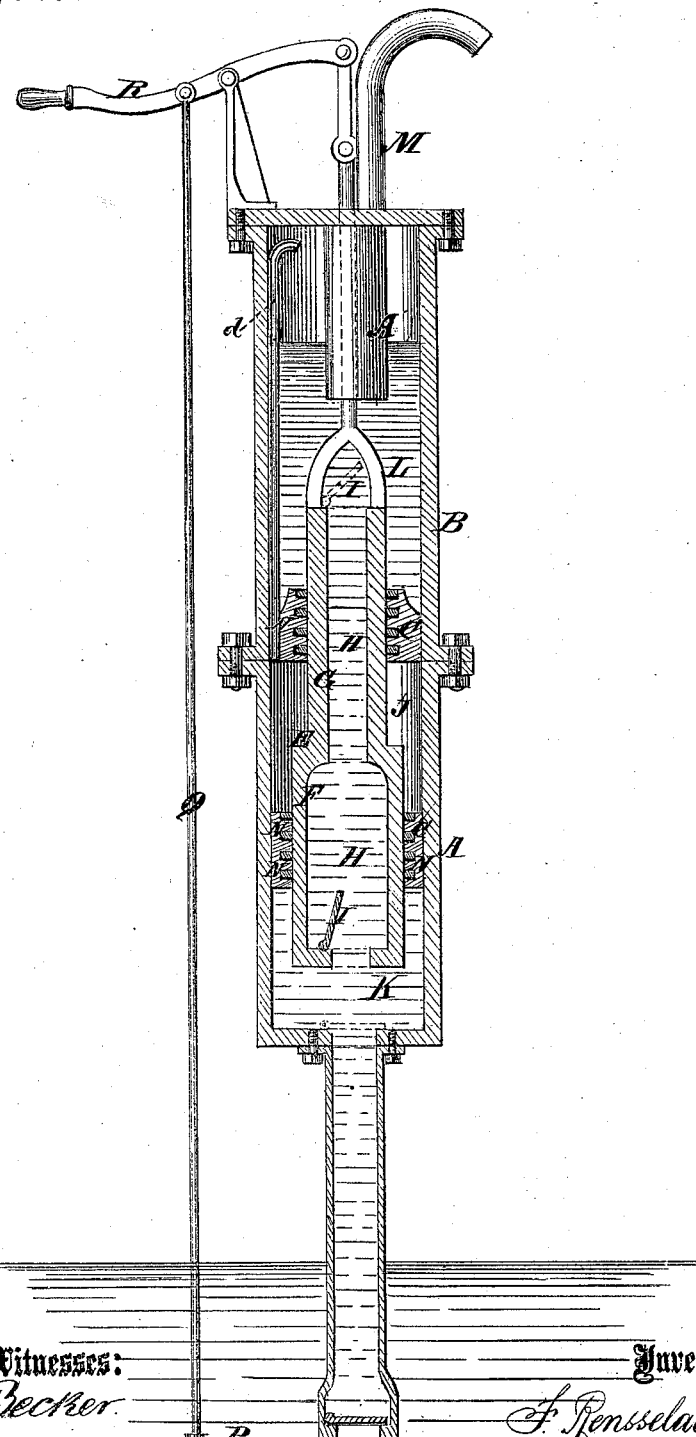

FREDERICK R. LOCKLING, OF HANNIBAL, MISSOURI.

IMPROVEMENT IN PUMPS.

Specification forming part of Letters Patent No. 130,647, dated August 20, 1872.

Specification describing a new and useful Improvement in Pumps, invented by FREDERICK RENSSELAER LOCKLING, of Hannibal, in the county of Marion and State of Missouri.

My invention consists of a long hollow pump-piston whose lower end has over twice the area of the upper end exclusive of the water-openings, and is arranged in two packings with an air or water chamber between, so that the upper part, which works in a chamber into which the water is forced, displaces only half the water the lower part does, to equalize the discharge as much as possible and produce a continuously-discharging single-acting pump by the aid of an air-cushion in the said chamber at the upper part of the piston. The invention also consists of an air-and-water packing for the piston produced by empty grooves in the piston-bearings, into which the water and air work when the piston is operated, and constitute a packing by obstructing an active or direct flow through the slight space between the piston and its bearings. The invention also consists of the application of a dasher to the cistern or well, suspended from the pump-handle by a rod into the water below to stir and agitate and mix the air with it to avoid the pumping of dead water.

The drawing is a sectional elevation of my improved pump.

The barrel or cylinder is preferably made of two sections, A B, joined together at one end by flanges and bolts, each section being provided with a bearing, C, for the pump-piston D, said bearings being as far apart as the movement of the piston, or a little more, so that the shoulder E of the piston between the large part F and the small part G will have room to play. This piston F G has a hollow passage, H, through it, with a valve, I, at one end, and discharges the water from the lower chamber K to the upper one L. In this latter chamber I propose to have a compressed-air cushion above the water, and I arrange the discharge-spout M to extend down through said air-cushion below the water surface, so that the air will act on the water while the piston is going down. The area of the bore of the discharge-spout is about half that of the passage H, or a little less, so that, although the water flows through the piston only during its down movement, the flow will be continuous through the spout M, and, in order to compensate for the lessened displacement of water in the upper chamber when the piston goes down, I have the lower part displaced over twice as much as the upper part, so that the water flows into the upper chamber enough to fill the space given up by said piston and to continue the discharge when said piston is going down. In the upward movement of the piston its displacement keeps up the discharge. The bearings C for the piston are provided with numerous annular grooves, N, which become filled with water and air soon after the piston begins to work, and when so filled have the effect of ordinary packing in preventing the water from flowing through. The space J becomes filled with air and water also, and acts as a packing-space. P represents the dasher, also suspended in the water near the lower end of the pump-tube by a rod, Q, attached to the pump-handle, to agitate the water and mix the air with it, and thus remove the deadness natural to standing water. When water is to be elevated to any great height I propose to connect the dead-air and water chamber J with the air-chamber L by means of a small passage like d. This will equalize the pressure in all three of the chambers J K L, and prevent the grit from working through and wearing the piston. The shoulder of the piston will force the excess of air out of this chamber when it rises.

Having thus described my invention, what I claim as new, and desire to secure by Letters Patent, is—

The combination of cylinder A B, having water-chambers K L, the hollow double-valved piston H I, and the discharge-pipe M, extending down into chamber L, as described, so that the pump will operate in the manner set forth.

FREDERICK RENSSELAER LOCKLING.

Witnesses:
WILLIAM P. STUART,
H. ROBLING.